United States Patent [19]
Srygley et al.

[11] Patent Number: 5,524,034
[45] Date of Patent: Jun. 4, 1996

[54] AUTOMATIC REVOLUTION COUNTING AND DATA TRANSMISSION DEVICE

[75] Inventors: James G. Srygley, Rockwall; John S. Elliott, Mesquite, both of Tex.

[73] Assignee: S & A Systems, Inc., Mesquite, Tex.

[21] Appl. No.: 334,270

[22] Filed: Nov. 4, 1994

Related U.S. Application Data

[63] Continuation of Ser. No. 877,877, May 4, 1992.

[51] Int. Cl.⁶ ................................................. G01C 22/00
[52] U.S. Cl. ................ 377/15; 377/24.1; 340/870.31; 340/825.54; 340/447; 340/457.4
[58] Field of Search ................ 377/24.1, 24.2, 377/15; 340/870.31, 825.54, 442, 445, 466, 447, 457.4

[56] References Cited

U.S. PATENT DOCUMENTS

| | | | |
|---|---|---|---|
| 4,697,278 | 9/1987 | Fleischer | 377/24.1 |
| 4,823,367 | 4/1989 | Kreutzfeld | 377/24.2 |
| 4,937,581 | 6/1990 | Baldwin et al. | 340/825.54 |
| 4,989,222 | 1/1991 | Lutts et al. | 377/24.1 |
| 5,130,955 | 7/1992 | Luerker et al. | 377/24.2 |
| 5,218,343 | 6/1993 | Stobbe et al. | 340/870.31 |

*Primary Examiner*—John S. Heyman
*Attorney, Agent, or Firm*—David W. Carstens; Strasburger & Price

[57] ABSTRACT

An automatic revolution counting and data transmission device for measuring full or partial revolutions of a shaft, processing, storing, and transmitting said revolutions and related data. An embodiment of the invention as a hubodometer for measuring rotations of a wheel uses of a housing (1), printed circuit board (3) with all electronic circuitry for counting data, data storage, and two way data communication, and an anti-rotation device. A low power radio frequency transmitter and receiver are used to receive commands and to transfer stored data to a receiving unit which may be a portable battery-powered unit or a fixed-mount unit. Such data transfer by RF link eliminates the inherent problems associated with visual readout or optical data transfer from units located where dirt grime buildup is common.

14 Claims, 2 Drawing Sheets

AUTOMATIC REVOLUTION COUNTING AND DATA TRANSMISSION DEVICE

This application is a continuation, of application Ser. No. 07/877,877, filed May 4, 1992.

TECHNICAL FIELD OF THE INVENTION

The present invention relates to an automatic revolution counting and data transmission device. Specifically, the device is mounted to a wheel for counting the number of rotations of the wheel and transmitting that count to a remote station.

BACKGROUND OF THE INVENTION

In many industries there exists a need for a device capable of automatically 1) counting revolutions of some type of rotating shaft, 2) storing the count data, and 3) transferring the data into a computer data processing system. The degree of accuracy, or resolution, required various from a count of complete revolutions (low resolution) to a measurement of partial revolutions in very small increments. Once revolutions are counted by such a device, the information describing revolution counts should be transferred in some manner in a machine (computer) readable format for data processing. The invention described herein is capable of counting revolutions, storing the revolution count information, and automatically transmitting revolution count information to a receiver unit which is connected to a computing device. One embodiment of this invention is an electronic hubodometer for measuring revolutions of a wheel on a moving vehicle. Several types of mechanical hubodometers are known in practice. Conceptual proposals for electronic hubodometers are not unknown in technical literature. To date, however, all such devices have depended upon visual or optical (infrared) readout of the information from the hubodometer. Exemplary hubodometers such as disclosed in U.S. Pat. No. 4,697,278 of Donald Fleischer and U.S. Pat. No. 4,989,222 of William Lutts et al. employ such optical transfer methods. Visual or optical transfer of data from a device mounted in an exposed position on the wheel of a vehicle is subject to continual problems due to buildup of dirt and road grime on the viewing window. The invention described herein overcomes this difficulty through the use of low power radio frequency link to transfer data to a receiving unit.

SUMMARY OF THE INVENTION

The invention consists of a housing and a small central shaft attached to the housing with the housing being permanently attached to the rotating object for which revolutions are to be counted. Inside the housing is an anti-rotation device with an attached electronic printed circuit board containing all electronic components and circuitry (p.c.) board remains stationary relative to the rotation of the housing around the p.c. board and in relation to the small shaft which passes through the center of the printed circuit board. Counting of rotations by the circuitry on the printed circuit board is accomplished by one of several means depending upon the accuracy required in the count data. For devices requiring count resolutions only in complete revolutions (such as the embodiment as a hubodometer) a magnet is attached to the rotating housing. This magnet then activates a reed switch which the electronic circuitry senses to count revolutions. For devices requiring a higher degree of accuracy, a slotted disk or a gear is attached to the rotating shaft which passes through the center of the p.c. board. An optical scanner is used to detect the slot's rotational movement or a gear tooth sensor is used to sense rotation of a gear. The number of slots in the rotating disk or the number of gear teeth is varied by the application. A microprocessor chip on the printed circuit board is used to control the logic for counting revolutions, to store the revolution count date in RAM memory, and the control and monitor the radio frequency receiver circuitry and data transmission circuitry, all contained on the p.c. board.

Operation of the invention is extremely simple. In its most basic embodiment the device will simply transmit an equipment identification number and a total number of revolutions any time it receives a coded transmission from a separate transmitter/receiver device which would normally be connected to a computer or computer terminal. Since a microprocessor is used within the invention, this processor can be used to maintain and then transmit other information that may be desirable for a particular application. Examples of this information are date and time, revolutions per time increment for various increments of time, and a maximum or minimum number of revolutions per time increment over some selected time period. The transmission range between the device and the separate transmitters/receivers unit can be varied depending upon requirements of a particular application. In the case of the embodiment as a hubodometer, this range is purposely kept small, approximately six feet.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE INVENTION

Figure 1:
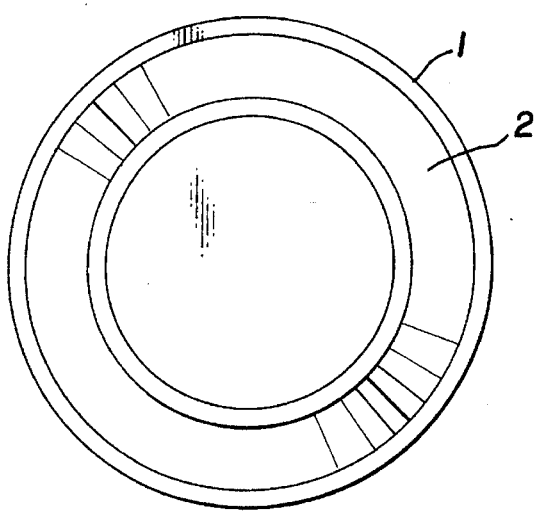
FIG. 1 is a front view with cover in place.
Figure 3:
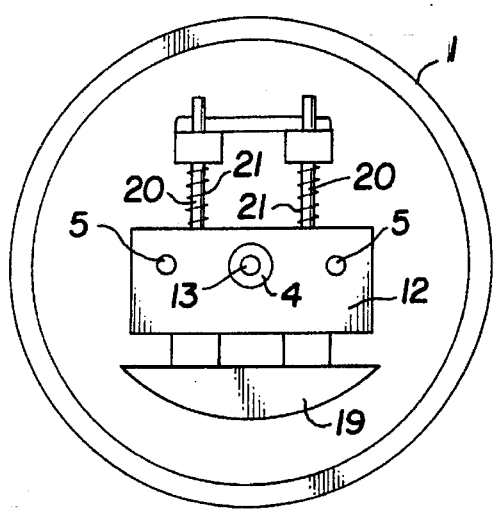
FIG. 3 is a front view further broken away showing the anti-rotation device which is behind the p.c. board.
Figure 2:
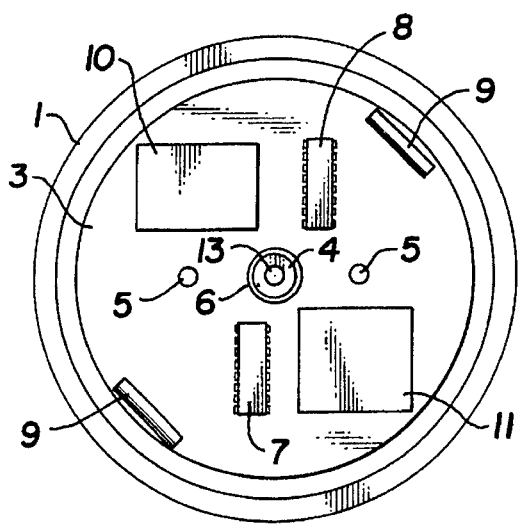
FIG. 2 is a front view partly broken away to show the printed circuit (p.c.) board.

Referring to FIGS. 1–4, the hubodometer consists of an outer metal housing 1 welded or otherwise attached to a threaded central shaft 4. The shaft 4 attaches to the hub of a vehicle either through use of a bracket and bolt (not shown) or by screwing into a threaded receptacle located in the wheel structure itself. As the hub rotates, the shaft 4 and hence the outer metal housing 1 turn along with it. Inside the unit, underneath the plastic cover 2, is an anti-rotation mechanism 12, shown in FIG. 3. This mechanism 12 has mounting holes 5 to which a p.c. board 3 can be connected using spaces 17 and screws 16, shown in FIGS. 2 and 4.

The anti-rotation mechanisms 12 is designed to prevent the board 5 from rotating—or "orbiting"—with the central shaft 4 due to angular forces experienced as the shaft 4 spins. To accomplish this goal, a weight 19 is used to vary the center of gravity of the mechanism 12. The weight 19 is attached to a movable rod 20 and then springs 21 are used to maintain the position of the weight 19 near the center of the device. Hence, with no forces acting upon the device, the center of gravity is maintained near the center of the device.

When the hub experiences angular forces, however, the weight 19 is thrown outward, thus adjusting the center of gravity to a lower point and preventing any angular acceleration experienced by the outer casing 1 from being transferred to the inner systems of the hub, which are mounted to the anti-rotation mechanism 12 and supported by the central shaft 4 for support in such a way as to minimize rolling friction. The anti-rotation mechanism 12 is kept on the shaft through the use of a retaining cap and a shaft cap 13, both of which are permanently attached to the central shaft 4. This configuration will allow pendulous movement about the shaft, but will prevent rotation.

Figure 4:
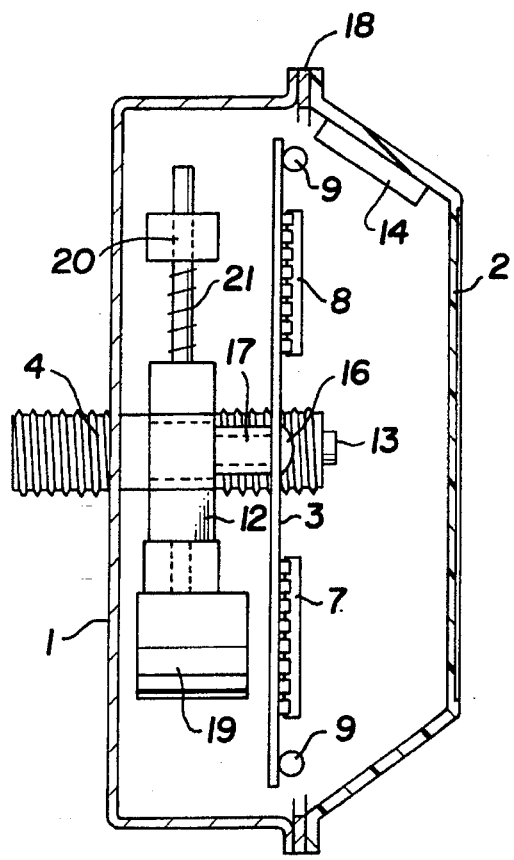
FIG. 4 is a transverse sectional view.

In the embodiment shown, a permanent magnet 14 is attached to the plastic cover 2 (see FIG. 4). As the outer easing 1 rotates, the plastic cover 2 and hence magnet 14 rotate as well. Located at opposite ends of the p.c. board 3 are sensors 9, in this case magnetic reed switches, which detect the presence of the magnet 14 within a small proximity. Hence, a signal can be generated which relates directly to the revolution of the hub unit. Note that although in this case magnets and reed switches were employed, there are several other mechanical and electromagnetic sensors and emitters which could have been used, including, but not limited to, optical sensors, gear tooth sensors, Hall effect devices, contact sensors, and others.

After the aforementioned signal is generated, it must be processed into a suitable machine-readable format for use by the microcontroller. The signal must be lengthened, debounced, and output at the correct signal level. The signal conditioner 8 takes care of this task.

Figure 5:
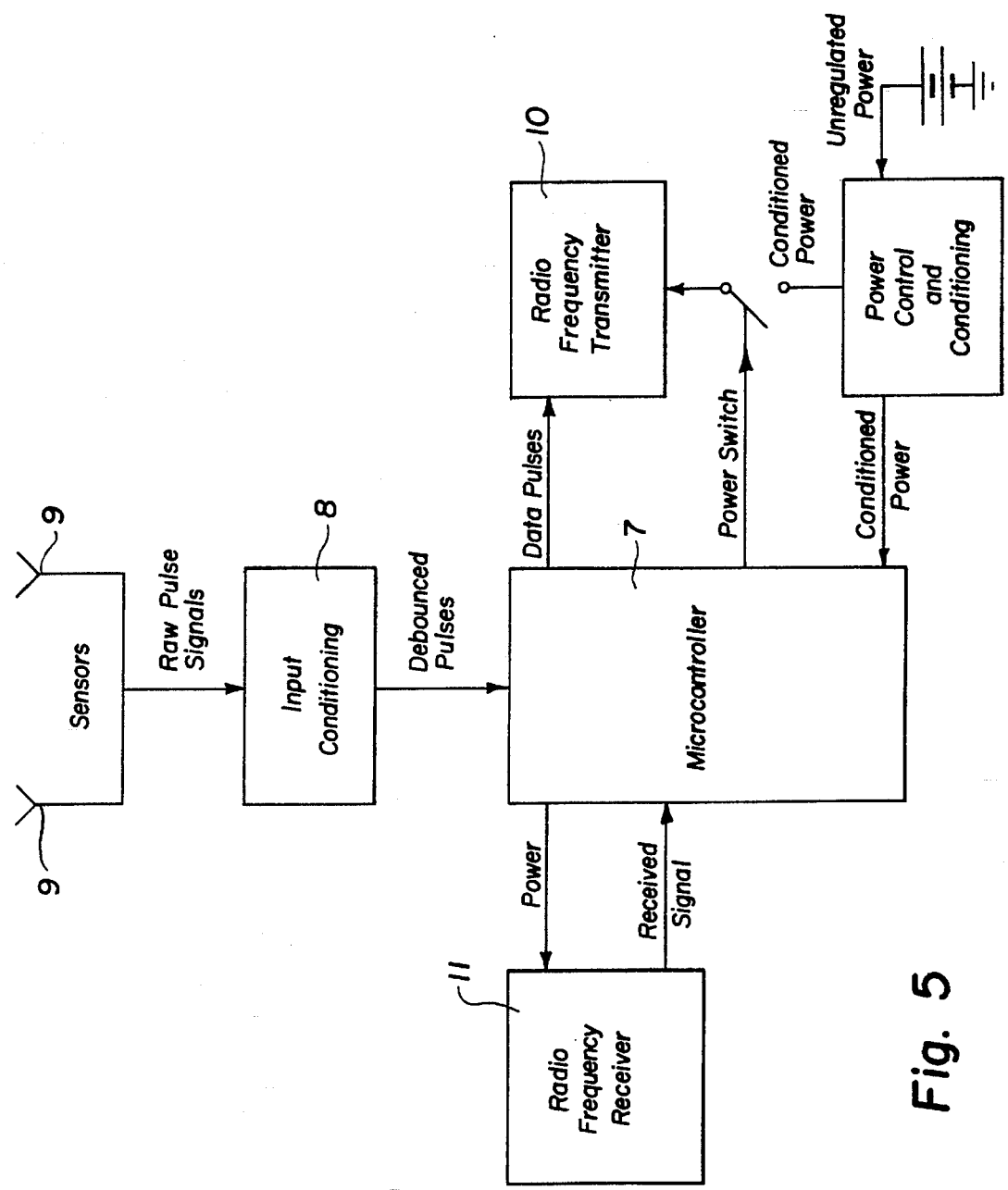
FIG. 5 is a systems overview showing the key functional electronic modules.

The heart of this system is a single chip microcontroller 7 (refer to FIG. 5), which includes onboard RAM (Random Access Memory) for storing data and onboard ROM (Read Only Memory) for storing the program. The processor 7 can control power conditioning and distribution; signal conditioning and signal processing functions, as well as control the receiver 11 and the transmitter 10 functions. Through the use of efficient power distribution algorithms, the controller 7 can extend battery life for many years.

The controller can be timed by a variety of methods such as RC or LC network, but is usually operated with a crystal. This enables accurate tracking of such variables as time, maximum revolutions in a given time frame, idle time, and many other functions. The controller 7 can then process this data into meaningful signals and broadcast that data to a master receiver unit using the transmitter 10 operating within a radio frequency range well below the aforementioned infrared frequency range disclosed as the operating range for the Fleischer patent above.

Full two way communication can be established with the device, thus enabling the unit to be reprogrammed, accept new parameters and instructions, store needed data, and so forth, without the necessity of changing processors, RAM or ROM chips, or otherwise intrusively interfering with the unit. In this way, the unit can be reprogrammed in the field without requiting that it be removed from service, thereby reducing the cost of upgrading the unit's capabilities at a future time. As stated previously, the processor transmits data to a nearby master unit within range. This transmission takes place in a machine readable format such a Pulse Width Modulation (PWM), Pulse Count Modulation (PCM), analog or digital transmission, or any other scheme capable of creating usable data.

The hub can be signalled to transmit its data at the proper time through the use of either a radio frequency beacon or a coded start signal which would be decoded by the processor 7 after being received by the receiver 11. The transmit signal is generated by a master receiver unit set up to receive the incoming data from the hub. The master receiver would itself be triggered to broadcast the beacon by a vehicle detector circuit, direct operator instruction, or other sensors to detect the presence of the hub unit. Upon receipt of the start signal, the hub can transmit an identification code, mileage data, status data, previously stored data, and any other information relative to its ability to collect data, including information from other sensors connected to the processor 7, but being in addition to the standard revolution counters 9.

Although preferred embodiments of the invention have been described in the foregoing Detailed Description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit of the scope of the invention.

We claim:

1. An automatic revolution counting device for counting the revolutions of a wheel attached to a rotating shaft, said device comprising:

(a) a counter attached to the rotating shaft including means for gathering information therefrom;

(b) two-way radio frequency communication means operating at a radio frequency range below the infrared frequency range coupled to the counter;

(c) a remote data acquisition device for gathering said information from said counter by way of said two-way radio frequency communication means.

2. The counting device of claim 1 wherein said counter comprises:

(a) a housing coupled to the rotating shaft such that said housing rotates with said shaft;

(b) an anti-rotation device mounted inside said housing such that said anti-rotation device does not rotate along with said rotating shaft;

(c) at least one magnet coupled to said housing;

(d) at least one sensor coupled to said anti-rotation device for sensing the passage of the magnet and produce an output indicative of said sensed passage;

(e) counting means operatively coupled to said sensor and operable to count a number of said sensed passages;

(f) processing means operatively coupled to said counting means and operable to calculate a quantity of distance traveled by said wheel.

3. The counting device of claim 1 wherein said two-way communication means comprises:

(a) data storage means coupled to said counter;

(b) a transmitter coupled to said counter for transmitting data stored in the data storage means;

(c) a receiver for receiving an initiation signal to initiate the transmitter.

4. The counting device of claim 2 further comprises:

(g) a cover sealingly attached to said housing to provide a seal against dust and moisture.

5. The counting device of claim 2 wherein said processor means comprises a microprocessor, wherein said microprocessor controls the two-way communications means.

6. The counting means of claim 2 wherein said sensor is a reed switch.

7. The counting means of claim 1 wherein the counter comprises:
   (a) a gear attached to the rotating shaft, and
   (b) a gear tooth sensor coupled to said gear, such that rotation of the rotating shaft produces rotation of the gear, said rotation of the gear creating a proportional signal from said sensor.

8. The counting device of claim 1 wherein said counter comprises:
   (a) a slotted disk attached to the rotating shaft; and
   (b) an optical detector mounted to the device, such that the detector detects the revolutions.

9. The counting device of claim 1 wherein said remote data acquisition device comprises:
   (a) an initiation signal transmitter, and
   (b) a data receiver.

10. The counting device of claim 9 wherein said data receiver is operable to receive and store data including a revolution count, an equipment identification number, and a time of entry.

11. The counting device of claim 5 wherein said microprocessor is coupled to a power supply used to power the counter and the two-way communications means.

12. The counting device of claim 11 wherein said microprocessor is operable to conserve said power supply.

13. The counting device of claim 2 wherein said anti-rotation device comprises:
   (a) a frame slidingly attached to the rotating shaft;
   (b) a weight translatably attached to the frame by at least one rod; and
   (c) at least one spring to bias the weight in a first, resting position.

14. The counting device of claim 13 wherein said weight positions to a second position when the rotating shaft is rotating, wherein the weight in the second position counteracts an angular force from the rotating shaft.

* * * * *

UNITED STATES PATENT AND TRADEMARK OFFICE
CERTIFICATE OF CORRECTION

PATENT NO. : 5,524,034
DATED : June 4, 1996
INVENTOR(S) : Srygley et al

It is certified that error appears in the above-identified patent and that said Letters Patent is hereby corrected as shown below:

In the Abstract

Line 14, "dirt grime" should read "dirt and grime".

Column 1, line 20, the word "various" should read "varies";

Column 1, lines 54 and 55, "circuitry (p.c.) board" should read "circuitry. The p.c. board";

Column 2, line 7, "and the control" should read "and to control";

Column 2, line 58, "spaces 17" should read "mechanism 12";

Column 2, line 59, "mechanisms 12" should read "mechanism 12";

Column 3, line 15, "easing 1" should read "casing 1"; and

Column 3, line 57, "requiting" should "requiring".

Signed and Sealed this

Seventeenth Day of September, 1996

*Attest:*

BRUCE LEHMAN

*Attesting Officer*  *Commissioner of Patents and Trademarks*